United States Patent
Michinishi et al.

(10) Patent No.: US 8,776,369 B2
(45) Date of Patent: Jul. 15, 2014

(54) THROUGH-HOLE MANUFACTURING METHOD FOR CYLINDRICAL BODY WALL AND CYLINDRICAL BODY STRUCTURE

(75) Inventors: Junya Michinishi, Hyogo (JP); Koichi Akagi, Hyogo (JP); Shuichi Kajiwara, Hyogo (JP); Katsunori Akiyama, Hyogo (JP); Sunao Aoki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 913 days.

(21) Appl. No.: 12/521,671

(22) PCT Filed: May 27, 2008

(86) PCT No.: PCT/JP2008/059741
§ 371 (c)(1),
(2), (4) Date: Jun. 29, 2009

(87) PCT Pub. No.: WO2008/146818
PCT Pub. Date: Dec. 4, 2008

(65) Prior Publication Data
US 2010/0313420 A1    Dec. 16, 2010

(30) Foreign Application Priority Data
May 28, 2007  (JP) ................................ 2007-140718

(51) Int. Cl.
*B23P 15/16* (2006.01)
*B23P 17/00* (2006.01)

(52) U.S. Cl.
USPC ....... 29/889; 29/557; 29/890.12; 29/890.132; 29/890.142; 72/325; 72/327

(58) Field of Classification Search
USPC .......... 59/557, 889, 889.22, 890.141, 890.12; 72/325, 327, 341
See application file for complete search history.

(56) References Cited

U.S. PATENT DOCUMENTS

| 4,136,273 A | * | 1/1979 | Eujita et al. | ............. 219/121.36 |
| 5,666,840 A | * | 9/1997 | Shah et al. | ........................ 72/55 |

(Continued)

FOREIGN PATENT DOCUMENTS

| EP | 0 169 764 A1 | 1/1986 |
| GB | 2 093 372 A | 9/1982 |

(Continued)

OTHER PUBLICATIONS

Supplementary Eurpean Search Report dated May 4, 2011, issued in corresponding European Patent Application No. 08776906.3.

(Continued)

*Primary Examiner* — Alexander P Taousakis
(74) *Attorney, Agent, or Firm* — Westerman, Hattori, Daniels & Adrian, LLP

(57) ABSTRACT

There is provided a through-hole manufacturing method for a cylindrical body wall that enables the operation of forming a through-hole without leaving a machining burr on the wall of a cylindrical member to be easily and reliably carried out without depending on experts. A through-hole manufacturing method for a cylindrical body wall in which a machining burr is not formed on inner walls of through holes formed by a tool piercing the wall of a cylindrical body, the method including a hole forming step of forming one pair or a plurality of pairs of the through-holes in the cylindrical body wall by the tool piercing the cylindrical body from the outside orthogonally or substantially orthogonally to a cylindrical body axis of the cylindrical body; and a welding step of sealing the through-hole formed by the tool piercing the cylindrical body from the outer wall to the inner wall by welding using a welding jig made of a material having better heat conductivity than the cylindrical body, wherein the through-hole formed by the tool piercing the cylindrical body from the inner wall to the outer wall is left as a nozzle hole.

2 Claims, 4 Drawing Sheets

(56) References Cited

U.S. PATENT DOCUMENTS

| | | | | |
|---|---|---|---|---|
| 5,811,756 | A | * | 9/1998 | Horita et al. .......... 219/137 WM |
| 2007/0157695 | A1 | | 7/2007 | Coelho et al. |

FOREIGN PATENT DOCUMENTS

| JP | 58-143915 A | 8/1983 |
|---|---|---|
| JP | 1-130896 A | 5/1989 |
| JP | 1-129063 U | 9/1989 |
| JP | 9-239610 A | 9/1997 |
| JP | 2000-254846 A | 9/2000 |
| JP | 2003-97291 A | 4/2003 |

OTHER PUBLICATIONS

International Search Report of PCT/JP2008/059741, Mailing Date of Sep. 2, 2008.

* cited by examiner

THROUGH-HOLE MANUFACTURING METHOD FOR CYLINDRICAL BODY WALL AND CYLINDRICAL BODY STRUCTURE

TECHNICAL FIELD

The present invention relates to a through-hole manufacturing method for a cylindrical body wall and to a cylindrical body structure that do not leave machining burrs on the inner walls of through-holes, such as fuel injection nozzles of gas turbine burners, for example.

BACKGROUND ART

Conventionally, fuel injection nozzles used for gas turbine burners have holes for fuel injection formed penetrating through a cylindrical body wall of a cylindrical member to a hollow section.

A fuel injection nozzle 1 shown in FIG. 6 has nozzle holes 3 that penetrate the wall of a cylindrical body 2 having the shape of a cylinder and through which fluid fuel is injected. The nozzle holes 3 are through-holes formed using a tool, such as a drill, from the outer peripheral side of the cylindrical body 2. When the tool pierces the wall, a machining burr protruding from the inner wall (toward the hollow section) of the cylindrical body 2 is produced. Since the presence of such a machining burr has a negative effect on the flow coefficient (Cd value), it becomes an obstacle to accurate control of the amount of fuel injection. In other words, to enable accurate control of the amount of fuel injection by reducing the variation in the flow coefficient, it is important to eliminate machining burrs (hereinafter, also referred to as "inner burrs") formed on the inner walls of the nozzle holes 3 to form sharp edges.

Therefore, in the fuel injection nozzle 1 according to the related art, flow control is carried out by forming the nozzle holes 3 through the wall by machining, followed by carrying out a process using, for example, a specialized tool shaped like an earpick having a file formed at the tip to manually remove the inner burr. With such flow control, the prescribed flow coefficient is required to satisfy a predetermined tolerance (for example, within ±10%).

As related art associated with a burr formed at the surface edge of a hole by carrying out drilling on a metal workpiece, a hole forming method and a hole forming drill that serve the dual purpose of removing burrs, which are capable of removing burrs at the same time as forming holes, have been proposed. In that proposal, after forming a hole at a reduced-diameter section at the drill tip, burr removal is carried out by scraping surface burrs with a shoulder portion having an inclined angle of substantially 45 degree with respect to the axial direction of the drill. (For example, refer to Patent Document 1.)

Patent Document 1:
Japanese Unexamined Patent Application, Publication No. HEI-9-239610 (see FIG. 1)

DISCLOSURE OF INVENTION

In the above-described nozzle holes 3 in the fuel injection nozzle 1, inner burrs are required to be manually removed using a specialized tool; therefore, it is essential to increase the level of proficiency for the operation in order to maintain stable quality. In other words, manually removing inner burrs is an operation that highly depends on expert workers and that depends on intuition; therefore, a problem that has been pointed out is that the working time is long and variations due to individual differences, etc. are large.

Based on such a background, there is a need for a through-hole manufacturing method for a cylindrical body wall and a cylindrical body structure that make it possible to easily and reliably carry out the operation of forming through-holes, such as nozzle holes formed in a fuel injection nozzle, without leaving machining burrs (inner burrs) on the wall of the cylindrical member, without depending on experts.

The present invention has been conceived in light of the circumstances described above, and an object thereof is to provide a through-hole manufacturing method for a cylindrical body wall and a cylindrical body structure that make it possible to easily and reliably carry out the operation of forming through-holes without leaving machining burrs (inner burrs) on the wall of the cylindrical member, without depending on experts.

To solve the above-described problem, the present invention employs the following solutions.

The through-hole manufacturing method for a cylindrical body wall according to the present invention is a through-hole manufacturing method for a cylindrical body wall in which a machining burr is not formed on an inner wall of a through hole formed by a tool piercing the cylindrical body wall, the method including a hole forming step of forming one pair or a plurality of pairs of through-holes in the cylindrical body wall by a tool piercing from the outside of the cylindrical body orthogonally or substantially orthogonally to a cylindrical body axis; and a welding step of sealing the through-hole formed by the tool piercing the cylindrical body from the outer wall to the inner wall by welding using a welding jig made of a material having better heat conductivity than the cylindrical body, wherein the through-hole formed by the tool piercing the cylindrical body from the inner wall to the outer wall remains.

Such a through-hole manufacturing method for a cylindrical body wall includes a hole forming step of forming one pair or a plurality of pairs of through-holes in the cylindrical body wall by a tool piercing from the outside of the cylindrical body orthogonally or substantially orthogonally to a cylindrical body axis; and a welding step of sealing the through-hole formed by the tool piercing the cylindrical body from the outer wall to the inner wall by welding using a welding jig made of a material having better heat conductivity than the cylindrical body, wherein the through-hole formed by the tool piercing the cylindrical body from the inner wall to the outer wall remains; therefore through-holes that do not have machining burrs (inner burrs) formed on the inner wall are formed in the cylindrical body.

A cylindrical body structure according to the present invention is a cylindrical body structure in which a machining burr is not formed on an inner wall of a through-hole formed by a tool piercing a cylindrical body wall, the structure including one pair or a plurality of pairs of through-holes formed in the cylindrical body wall by the tool piercing the cylindrical body wall from the outside of the cylindrical body orthogonally or substantially orthogonally to a cylindrical body axis; and a sealing member configured to seal the through-hole formed by the tool piercing the cylindrical body from the outer wall to the inner wall, wherein the through-hole formed by the tool piercing the cylindrical body from the inner wall to the outer wall is left to serve as a through-hole having no machining burr on the inner wall.

Such a cylindrical body structure includes one pair or a plurality of pairs of through-holes formed in the cylindrical body wall by the tool piercing the cylindrical body wall from the outside of the cylindrical body orthogonally or substantially orthogonally to a cylindrical body axis; and a sealing member configured to seal the through-hole formed by the tool piercing the cylindrical body from the outer wall to the inner wall, wherein the through-hole formed by the tool piercing the cylindrical body from the inner wall to the outer wall is left to serve as a through-hole having no machining burr on the inner wall; therefore, a cylindrical body having through-holes that do not have machining burrs (inner burrs) formed on the inner wall can be easily manufactured.

In the above-described cylindrical body structure, it is preferable to use the through-holes having no machining burrs on the inner wall as nozzle holes through which a fluid is discharged from the inner wall to the outer wall. In this way, nozzle holes having a stable flow coefficient can be easily formed in the cylindrical body. A preferable cylindrical body in such a case is a fuel injection nozzle of a gas turbine burner.

With the above-described through-hole manufacturing method for a cylindrical body wall and cylindrical body structure according to the present invention, the operation of forming through-holes, such as nozzle holes formed in a fuel injection nozzle, without leaving machining burrs (inner burrs) on the wall of a cylindrical member can be easily and reliably carried out without depending on experts and intuition. Therefore, significant advantages such as shortening of the working time required for manufacturing the cylindrical member having through-holes, such as the fuel injection nozzle and so on, and product variations due to individual difference etc. can be eliminated, and stability can be achieved.

EXPLANATION OF REFERENCE SIGNS

Figure 1:
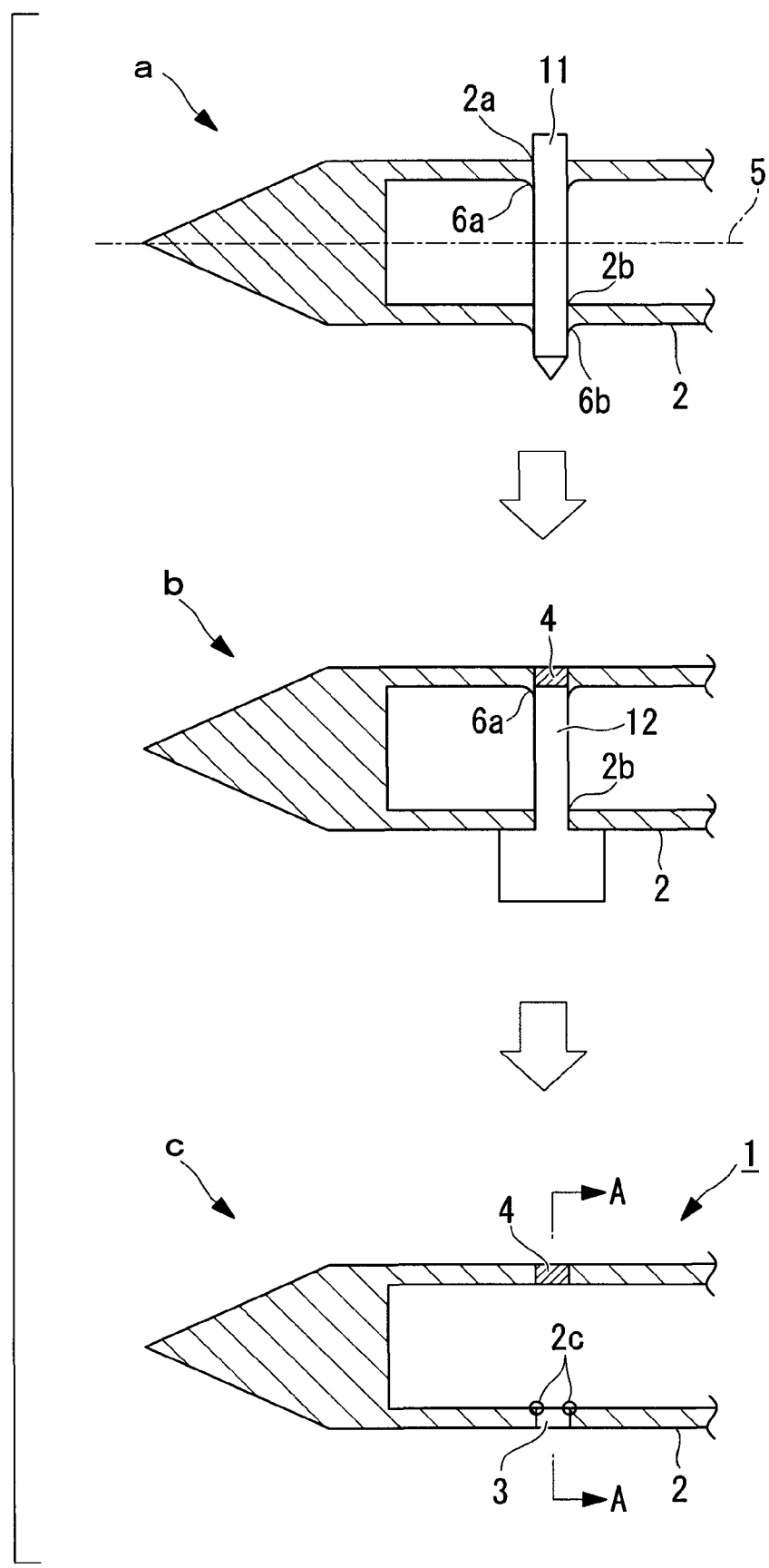
FIG. 1 is a process diagram illustrating an embodiment of a through-hole manufacturing method for a cylindrical body wall according to the present invention, where a illustrates a hole forming process, b illustrates a welding process, and c illustrates a completed state.

1: fuel injection nozzle
2: cylindrical body
2a, 2b: through-hole
3: nozzle hole
4: sealing member
6a, 6b: machining burr
11: tool
12: welding jig
20: double cylindrical body
21: outer cylinder
22: inner cylinder
23, 24: through-hole

BEST MODE FOR CARRYING OUT THE INVENTION

An embodiment of a through-hole manufacturing method for a cylindrical body wall and a cylindrical body structure according to the present invention will be described below with reference to the drawings.

FIG. 1 is a process diagram illustrating the through-hole manufacturing method for a cylindrical body wall that does not generate machining burrs on the inner wall of the through-holes formed by a tool piercing the cylindrical body wall. In the description below, nozzle holes (through-holes) 3 are formed in a fuel injection nozzle (cylindrical body wall) 1 of a gas turbine burner.

Figure 2:
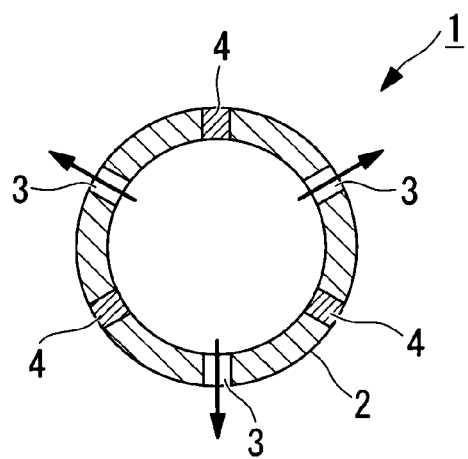
FIG. 2 illustrates an A-A cross-section of the completed state in FIG. 1.
Figure 3:
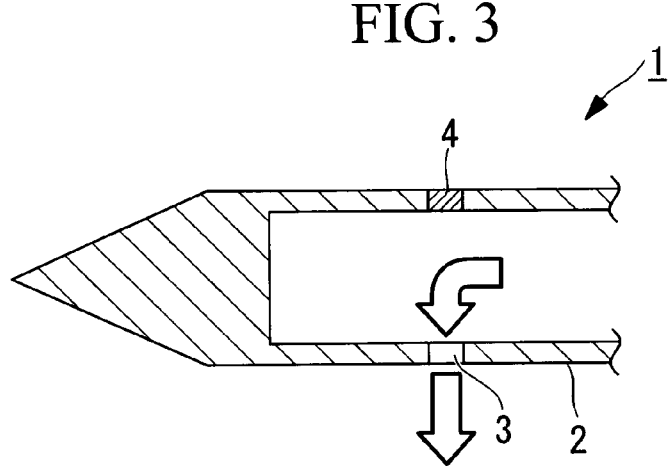
FIG. 3 is a sectional view showing an example configuration of a fuel injection nozzle used for a gas turbine burner, as an embodiment of a cylindrical body structure manufactured according to the manufacturing method shown in FIG. 1.

The fuel injection nozzle 1 employing this manufacturing method has three nozzle holes 3 penetrating the wall of a cylindrical body 2 in a radiating pattern, as shown in FIGS. 2 and 3. The three nozzle holes 3 are arranged in a radiating pattern at a 120-degree pitch in a cross section orthogonal to the axis of the fuel injection nozzle 1. In FIGS. 2 and 3, reference numeral 4 in the drawings represents a sealing member, which is described below.

In the hole-forming process shown in FIG. 1a, a pair of through-holes 2a and 2b is formed in the wall of the cylindrical body 2 by a tool 11 piercing the cylindrical body 2 from the outside orthogonally or substantially orthogonally to an axis 5 of the cylindrical body 2. In the illustrated example, the tool 11, e.g., a drill, pierces the cylindrical body 2 downward from outside the upper section, passing through the axis 5, to form the pair of top and bottom through-holes 2a and 2b. To form the three nozzle holes 3 at a 120-degree pitch, three pairs of the above-described through-holes 2a and 2b are formed at a 120-degree pitch.

At the through-holes 2a and 2b formed in this way, a machining burr (inner burr) 6a protruding from the inner wall is formed at the through-hole 2a formed by the tool 11 piercing through the cylindrical body 2 to the inner wall, and a machining burr (outer burr) 6b protruding from the outer wall is formed at the through-hole 2b formed by the tool 11 piercing through the cylindrical body 2 to the outer wall.

Next, in the welding process illustrated in FIG. 1b, the through-hole 2a formed by the tool 11 piercing the cylindrical body 2 from the outer wall to the inner wall is sealed by forming a sealing member 4 by welding using a welding jig 12 made of a material having better heat conductivity than that of the cylindrical body 2. This process is a process for sealing the through-hole 2a at which the machining burr 6a, having a negative effect on the flow coefficient, is formed when the pair of through-holes 2a and 2b are formed for use as the nozzle holes 3.

In other words, this welding process is a seal welding process performed to seal the through-hole 2a having the inner burr with the sealing member 4 so that it cannot be used as a nozzle hole 3, instead of removing the machining burr 6a that causes a large variation in the flow coefficient, even with through-holes 2a having the same diameter.

On the other hand, because the machining burr 6b protruding from the outer wall of the cylindrical body 2 is at a position that does not greatly affect the flow coefficient of the through-hole 2b, and because the inner wall of the through-hole 2b has a sharp edge 2c, the through-hole 2b is used as is as a nozzle hole 3.

In other words, the through-hole 2b formed by the tool 11 piercing the cylindrical body 2 from the inner wall to the outer wall functions as a nozzle hole 3, while leaving the machining burr 6b as is. Since the machining burr 6b in such a case is on the outer wall of the cylindrical body 2, even if it needs to be removed, that operation is easy.

The above-described cylindrical body 2 functioning as the fuel injection nozzle 1 is made of a heat-resistant alloy, for example, SUS304. It is desirable to make the welding jig of a material having good heat conductivity; a material such as a copper alloy, e.g., copper or brass, or aluminum alloy is desirable.

Figure 5A:
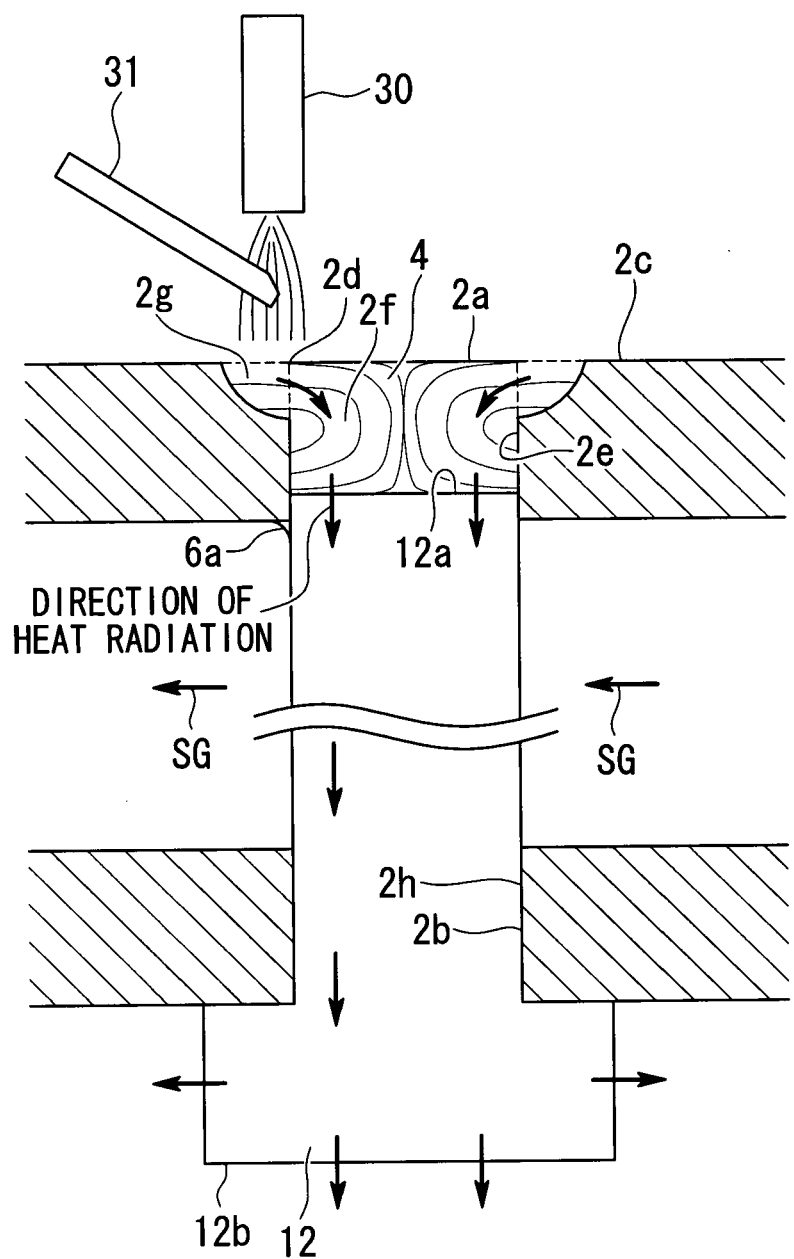
FIG. 5A illustrates TIG welding as an example of a welding method.

For the welding method, in addition to TIG welding, it is effective to employ a welding method that can relatively reduce the amount of heat input, such as laser welding. In other words, it is important to keep the heat input due to welding small, to form a metal retaining section 2f for retaining the melted sealing member 4 with an inner wall 2e of the through-hole 2a and a front end section 12a of the welding jig 12 inserted into the through-hole 2a from the inside, and to provide conditions that allow the boundary surface of the sealing member 4 and the front end section of the welding jig 12 not to melt (FIG. 5A). By realizing such conditions, the through-hole 2a can be sealed with the sealing member 4 and the welding jig 12 can be removed from the cylindrical body 2 immediately after welding; therefore, nozzle holes 3 having a stable flow coefficient can be easily formed.

The object of the above-described welding jig 12 is to form the metal retaining section 2f with the inner wall of the through-hole 2a of the cylindrical body 2 and the front end section 12a of the welding jig 12 in order to facilitate the retention of the sealing member 4 inside the through-hole 2a and to quickly radiate the heat input during welding outside the system.

Here, TIG welding is given as one example and will be described in detail with reference to FIG. 5A.

In the welding process, an arc is generated by targeting a circumference 2d of the outer surface 2c of the through-hole 2a with a welding torch 30, and circumferential welding is carried out around the circumference 2d. In this process, part of a base material 2g of the cylindrical body 2 and a welding rod 31 are melted to form the sealing member 4. The welding rod 31 is made of a material similar to that of the cylindrical body 2. In such a case, it is desirable to keep the electrical current value low and to carry out welding at high speed in order to reduce the heat input as much as possible. By employing such a welding method, the melted sealing member 4 fills the metal retaining section 2f formed by the inner wall 2e of the through-hole 2a and the front end section 12a of the welding jig 12, and the through-hole 2a is completely sealed by solidification of the sealing member 4.

As shown in FIG. 5A, most of the heat input during welding is transferred by heat conduction from the metal retaining section 2f to a rear end section 12b of the welding jig 12 through the front end section 12a of the welding jig 12 and is dissipated from the rear end section 12b to the atmosphere. In this way, most of the welding heat does not diffuse to the cylindrical body 2 surrounding the through-holes 2a and 2b but dissipates from the rear end section 12b of the welding jig 12 into the atmosphere because the heat conductivity of the welding jig 12 is significantly greater than the heat conductivity of the cylindrical body 2. When a copper welding jig 12 is used, a combination of a copper welding jig 12 and a stainless steel cylindrical body 2 is used; therefore, the heat conductivity ratio of the welding jig to the cylindrical body is 20 times or more.

Figure 5B:
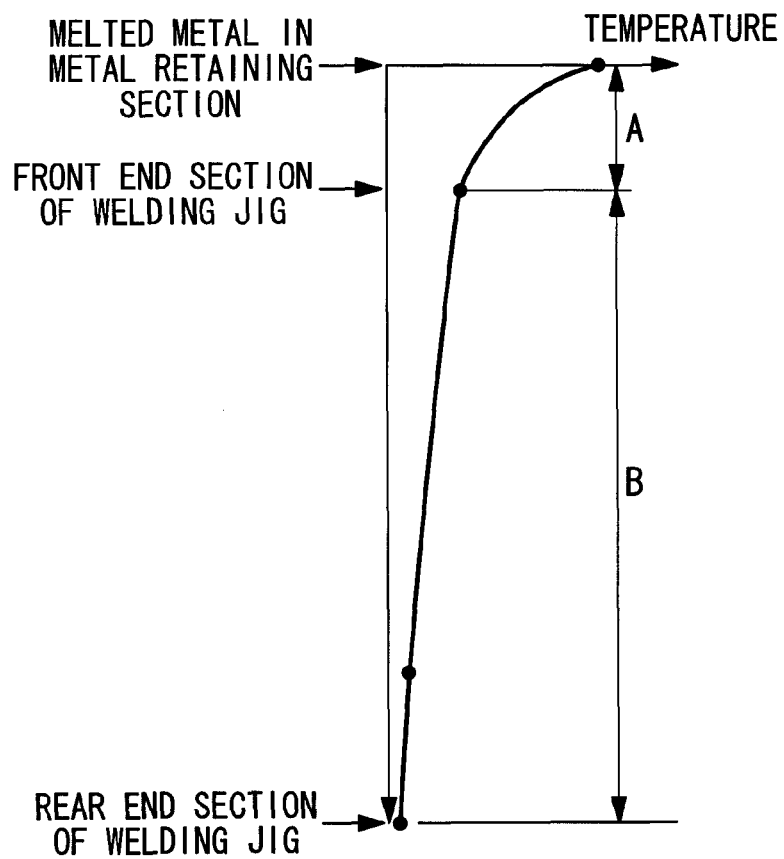
FIG. 5B illustrates a temperature gradient of FIG. 5A.
Figure 6:
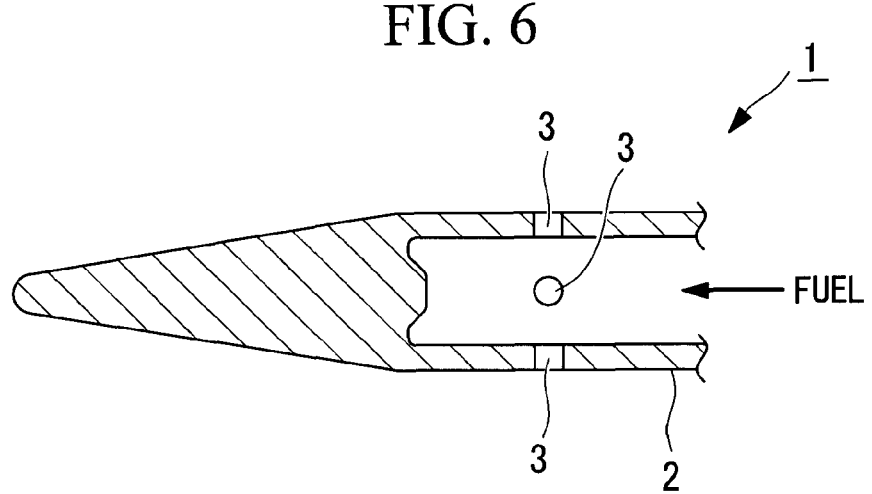
FIG. 6 is a sectional view showing an example configuration of a fuel injection nozzle used in a gas turbine burner serving as an example of the related art.

As a result, a temperature gradient, such as that shown in FIG. 5B, is generated from the circumference 2d of the through-hole 2a to the rear end section 12b of the welding jig 12. In other words, since the melted sealing member 4 being retained in the metal retaining section 2f is mostly composed of the same material as the base material of the cylindrical body 2, the heat conductivity is extremely small compared with that of the welding jig 12. Accordingly, if a combination of appropriate materials for the welding jig and the cylindrical body is selected, by setting a large heat conductivity ratio of the welding jig to the cylindrical body, an extreme temperature drop occurs in the melted sealing member 4 near the circumference 2d, where the arc strikes, from the retaining metal retaining section 2f to the front end section 12a of the welding jig (region A in FIG. 5B).

Since a material having high heat conductivity is used from the front end section 12a of the welding jig 12 to the rear end section 12b, the temperature gradient is gradual compared with that of the metal retaining section 2f where the melted sealing member 4 is retained (region B in FIG. 5B).

By finding such a combination, the temperature at the front end section 12a of the welding jig 12 is maintained at or below the melting point; therefore, conditions that allow removal of the welding jig 12 from the cylindrical body 2 immediately after welding are satisfied.

It is preferable that the above-described heat conductivity ratio of the welding jig to the cylindrical body be set as large as possible: at least five times or more, and more preferably, ten times or more.

In the above-described welding process, the welding torch 30 targets the circumference 2d, not the inner wall 2e of the through-hole 2a, in order to target a point as far away as possible from the front end section 12a of the welding jig 12 while melting part of the base material 2g of the cylindrical body 2. In other words, if a point close to the front end section 12a of the welding jig 12 is targeted, the temperature of the front end section 12a become high, and thus, the welding jig 12 is prevented from becoming difficult to remove after welding is completed after the front end section 12a and the sealing member 4 are welded.

In the welding process, small amounts of an inert gas SG, such as argon, are supplied to an inner channel 26 of the cylindrical body 2 to seal the welded sections with inert gas to prevent oxidation of the welded portion. By preventing such oxidation, the fluidity of the melted sealing member 4 is maintained, and stable welding is possible.

Due to the difference in heat conductivity described above, phenomena such as heat transfer due to heat being conducted from the sealing member 4 to the cylindrical body 2 via the wall of the through-hole 2a and dissipation due to heat being transferred from the sealing member 4 to the rear end section 12b of the welding jig 12 via the welding jig 12 and due to heat being conducted further to the surroundings of the cylindrical body 2 via a wall 2h of the through-hole 2b are reduced. Consequently, uneven distribution of heat can be kept low in the entire cylindrical body 2, particularly in the circumferential direction, and heat deformation due to input heat during welding is reduced.

By employing the above-described combination of the welding jig 12 and the cylindrical body 2, a temperature gradient shown in FIG. 5B is obtained, the temperature of the front end section 12a of the welding jig 12 is maintained equal to or lower than the melting point, and melting of the front end section 12a can be prevented. The input heat to the welded portion of the cylindrical body 2 is quickly dissipated to the atmosphere. Therefore, the through-hole 2b functioning as a nozzle hole 3 is prevented from deforming due to welding deformation, and a desired nozzle performance can be maintained.

In such a through-hole manufacturing method for a cylindrical body wall, there is no machining burr (inner burr)

protruding from the inner wall formed by hole forming at the through-hole 2b of the cylindrical body 2, and a sharp edge 2c is formed on the inner wall; therefore, if the diameter of the through-hole 2b is formed with precision, it can be directly used as a nozzle hole 3, without carrying out burr removal.

In other words, burr removal using specialized tools and carried out by experts is not required when forming the nozzle holes 3 having a small variation in the flow coefficient on the fuel injection nozzle 1; therefore, the versatility of the operation is improved. Consequently, in through-hole manufacturing in a cylindrical body wall, the work time can be shortened, and product variations due to individual differences, etc. can be eliminated.

The fuel injection nozzle 1 manufactured by the above-described through-hole manufacturing method for a cylindrical body wall has a cylindrical body structure that does not have machining burrs on the inner wall of the through-hole 2b formed by the tool 11 piercing the wall of the cylindrical body 2. The fuel injection nozzle 1 having such a cylindrical body structure includes one pair or a plurality of pairs of through-holes 2a and 2b formed in the wall of the cylindrical body 2 by the tool 11 piercing the wall of the cylindrical body 2 orthogonally or substantially orthogonally to the cylindrical body axis 5 from the outside of the cylindrical body 2 and a sealing member 4 for sealing, by welding, the through-hole 2a formed by the tool 11 piercing the cylindrical body 2 from the outer wall to the inner wall, wherein the through-hole 2b formed by the tool 11 piercing the cylindrical body 2 from the inner wall to the outer wall is left as a through-hole for the nozzle hole 3 without having a machining burr on the inner wall.

Here, examples of specific dimensions of the cylindrical body 2 and nozzle holes 3 of the fuel injection nozzle 1 of the gas turbine burner will be described. For example, the cylindrical body 2 having a hollow cylindrical shape formed by cutting a stainless steel rod has an outer diameter of approximately 20 mm, an inner diameter of approximately 15 mm, a nozzle hole 3 diameter of approximately 5 mm, and a wall thickness of approximately 2.5 mm. When hole forming is carried out on such a cylindrical body 2 with the tool 11, such as a drill, the machining burrs 6a and 6b protruding by approximately 0.1 mm are formed.

According to such a cylindrical body structure, the through-hole 2b, which does not have a machining burr (inner burr) protruding from the inner wall of the cylindrical body 2, can be easily formed with the tool 11, such as a drill, and the through-hole 2b can be used as a nozzle hole 3 having no variation in the flow coefficient. As a result, for the fuel supplied from the fuel injection nozzle 1, if the diameter of the nozzle hole 3 is machined to be within a predetermined error range, as shown by the white arrows in FIG. 3, the amount of fuel injection (flow coefficient) discharged from the nozzle hole 3 will be within a predetermined tolerance with a small variation.

In other words, in the cylindrical body structure according to the present invention, the through-hole 2b, which has a sharp edge without a machining burr on the inner wall affected by the flow coefficient, is preferable as the nozzle hole 3 through which a fluid is discharged from the inner wall side to the outer wall side, and thus a nozzle hole 3 having a stable flow coefficient can be easily formed in the cylindrical body 2.

In the description above, the cylindrical body 2 having the nozzle holes 3 is described as the fuel injection nozzle 1 of the gas turbine burner. However, the present invention is not limited thereto.

Figure 4:
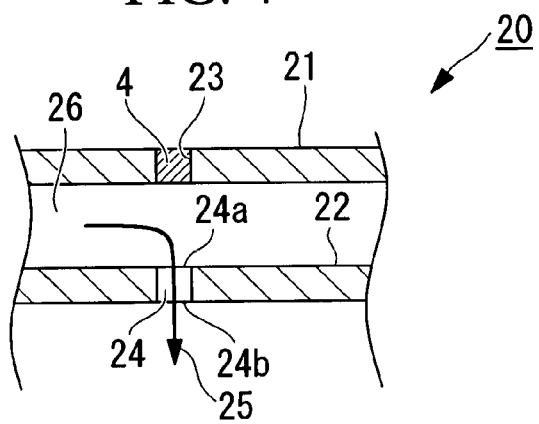
FIG. 4 is a sectional view showing an example configuration employed in a double cylindrical body, as another embodiment of the present invention.

For example, as in another embodiment illustrated in FIG. 4, at through-holes 23 and 24 formed by a tool piercing an outer cylinder 21 and an inner cylinder 22 of a double cylindrical body 20 from the outside, a pierced hole 24 can be employed as a nozzle hole for discharging flowing fluid flowing, as shown by arrow 25. In such a case, at a pierced hole 24a, a machining burr is formed at a corner section 24b on the fluid outlet side, and a corner section 24a on the fluid inlet side forms a sharp edge; therefore, such nozzle holes in the fluid flow direction will have no variation in the flow coefficient.

However, for the through-hole 23 formed in the outer cylinder 21, a sharp edge is formed on the outer wall of the outer cylinder 21, and a machining burr protruding from the inner wall is formed. Therefore, when a fluid is discharged outside the outer cylinder 21 from a channel 26 formed between the outer cylinder 21 and the inner cylinder 22, the machining burr protruding from the inner wall negatively affects the flow coefficient and causes a variation. Consequently, the through-hole 23 is sealed with a sealing member 4 similar to that according to the above-described embodiment.

According to the above-described present invention, for example, as with the nozzle holes 3 formed in the fuel injection nozzle 1 of the gas turbine burner, the operation of forming the through-hole 2b without leaving a machining burr (inner burr) protruding from the inner wall of the cylindrical body 2 can be easily and reliably carried out without depending on experts and intuition. Therefore, the working time required for manufacturing the cylindrical body 2 having the through-hole 2b, such as the fuel injection nozzle 1 and so on, can be shortened, and product variations (flow coefficient, etc.) due to individual differences, etc. can be eliminated, achieving stability.

The above-described present invention is preferable for forming a nozzle hole 3 through which a fluid is injected. However, it can also be employed in a case in which a through-hole without a machining burr on the inner wall is formed.

The above-described present invention is not limited to the descriptions of the embodiments, such as matching the number of through-holes sealed by the sealing member 4 and the number of through-holes used as the nozzle holes 3 when four nozzle holes 3 are formed at a 90-degree pitch, or such as the number of pairs of through-holes (the number of nozzle holes 3) except when they are at interfering positions; appropriate modifications may be made within the scope of the present invention.

The invention claimed is:

1. A through-hole manufacturing method, the method comprising:
a hole forming step of forming at least one pair of diametrically opposed through-holes comprising a first and second through-hole each having a same hole diameter in a cylindrical body by a tool piercing from outside of the cylindrical body, substantially orthogonal to a main axis of the cylindrical body, through an outer wall of the cylindrical body to an inner wall of the cylindrical body to form the first through-hole, and then through the inner wall of the cylindrical body to the outer wall of the cylindrical body to form the second through-hole; and
a welding step of sealing the first through-hole by forming a sealing member having a same diameter as that of the first through-hole by welding using a welding jig made of a material having better heat conductivity than the cylindrical body,
wherein the second through-hole remains, and
a machining burr is not formed on the inner wall of the second through-hole in the cylindrical body.

2. The through-hole manufacturing method according to claim 1, wherein the sealing member is melted by welding to fill a metal retaining section formed by an inner wall of the first through-hole and a front end section of the welding jig inserted into the first through-hole from the inside.

\* \* \* \* \*